(12) United States Patent
Movshovitz

(10) Patent No.: US 10,902,145 B2
(45) Date of Patent: *Jan. 26, 2021

(54) METHOD AND COMPUTER PROGRAM PRODUCT FOR ORDER PRESERVING SYMBOL BASED ENCRYPTION

(71) Applicant: salesforce.com, inc., San Francisco, CA (US)

(72) Inventor: David Movshovitz, Raanana (IL)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,115

(22) Filed: Mar. 4, 2019

(65) Prior Publication Data
US 2019/0347439 A1   Nov. 14, 2019

Related U.S. Application Data

(63) Continuation of application No. 15/676,876, filed on Aug. 14, 2017, now Pat. No. 10,223,546, which is a continuation of application No. 14/740,124, filed on Jun. 15, 2015, now Pat. No. 9,734,350, which is a continuation of application No. 13/855,761, filed on Apr. 3, 2013, now Pat. No. 9,100,183, which is a continuation of application No. 13/579,934, filed as
(Continued)

(51) Int. Cl.
*H04L 9/06* (2006.01)
*G06F 21/62* (2013.01)
*H04L 9/08* (2006.01)
*H04L 9/00* (2006.01)
*H04L 9/32* (2006.01)

(52) U.S. Cl.
CPC ............ *G06F 21/6227* (2013.01); *H04L 9/00* (2013.01); *H04L 9/0618* (2013.01); *H04L 9/0662* (2013.01); *H04L 9/0891* (2013.01); *H04L 9/3213* (2013.01)

(58) Field of Classification Search
None
See application file for complete search history.

(56) References Cited

U.S. PATENT DOCUMENTS

| | | |
|---|---|---|
| 5,307,412 A | 4/1994 | Vobach |
| 5,577,188 A | 11/1996 | Zhu |
| 5,608,872 A | 3/1997 | Schwartz et al. |

(Continued)

OTHER PUBLICATIONS

Non-Final Office Action for U.S. Appl. No. 15/676,876 dated Apr. 27, 2018, 9 pages.
(Continued)

*Primary Examiner* — Brandon S Hoffman
(74) *Attorney, Agent, or Firm* — Jaffery Watson Mendonsa & Hamilton LLP

(57) ABSTRACT

Techniques for sorting encrypted data within a software as a service (SaaS) environment. Data is encrypted on a per symbol basis with a symbol based encryption module. Sort and search functionality preserving encryption that allows other modules to sort tokens and to search for tokens is provided. Encrypted tokens that have been encrypted by the symbol based encryption module are stored in a database. Access to the encrypted tokens is provided through the SaaS environment.

18 Claims, 13 Drawing Sheets

Related U.S. Application Data application No. PCT/IB2011/050726 on Feb. 22, 2011, now Pat. No. 9,059,851.

(60) Provisional application No. 61/307,079, filed on Feb. 23, 2010.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0223608 A1 | 11/2004 | Oommen et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0097061 A1 | 5/2005 | Shapiro et al. |
| 2006/0075228 A1* | 4/2006 | Black .................. H04L 63/0428 713/167 |
| 2006/0277153 A1 | 12/2006 | Mason et al. |
| 2006/0291650 A1 | 12/2006 | Ananth |
| 2008/0077570 A1* | 3/2008 | Tang .................. G06F 16/3344 |
| 2008/0133935 A1 | 6/2008 | Elovici et al. |
| 2008/0282096 A1 | 11/2008 | Agrawal et al. |
| 2009/0113213 A1 | 4/2009 | Park et al. |
| 2009/0125796 A1* | 5/2009 | Day ........................ G06F 9/451 715/219 |
| 2009/0147960 A1* | 6/2009 | Maeda .................... G06F 21/10 380/277 |
| 2009/0300351 A1 | 12/2009 | Lei et al. |
| 2009/0327748 A1 | 12/2009 | Agrawal et al. |

OTHER PUBLICATIONS

Notice of Allowance for U.S. Appl. No. 15/676,876 dated Oct. 26, 2018, 5 pages.

Non-Final Office Action for U.S. Appl. No. 13/579,934 dated Jun. 26, 2014, 7 pages.

International Search Report and Written Opinion for PCT/IB2011/050726 dated Jun. 30, 2011, 15 pages.

International Preliminary Report on Patentability for PCT/IB2011/050726 dated Sep. 7, 2012, 13 pages.

Song et al. "Practical Techniques for Searches on Encrypted Data". In SP '00 Proceedings of the 2000 IEEE Symposium on Security and Privacy, pp. 44-55. Published May 14, 2000.

(56) References Cited

OTHER PUBLICATIONS

Boldyreva et al. "Order Preserving Symmetric Encryption". In EUROCRYPT '09 Proceedings of the 28th Annual International Conference on Advances in Cryptology: the Theory and Applications of Cryptographic Techniques, pp. 224-241. Published. Apr. 2009.
Non-Final Office Action for U.S. Appl. No. 13/855,761 dated Oct. 17, 2014, 5 pages.
Final Office Action for U.S. Appl. No. 13/579,934 dated Dec. 1, 2014, 8 pages.
Notice of Allowance for U.S. Appl. No. 13/579,934 dated Feb. 11, 2015, 5 pages.
Notice of Allowance for U.S. Appl. No. 13/855,761 dated Mar. 31, 2015, 5 pages.
Final Office Action for U.S. Appl. No. 14/740,124 dated Jan. 12, 2017, 6 pages.
Non-Final Office Action for U.S. Appl. No. 14/740,124 dated Aug. 23, 2016, 9 pages.
Notice of Allowance for U.S. Appl. No. 14/740,124 dated Apr. 12, 2017, 5 pages.

\* cited by examiner

200

METHOD AND COMPUTER PROGRAM PRODUCT FOR ORDER PRESERVING SYMBOL BASED ENCRYPTION

CLAIM OF PRIORITY

This continuation application is related to, and claims priority to, U.S. patent application Ser. No. 15/676,876, with a filing date of Aug. 14, 2017, now U.S. Pat. No. 10,223,546 issued Mar. 5, 2019, which is related to, and claims priority to, U.S. patent application Ser. No. 14/740,124, with a filing date of Jun. 15, 2015, now U.S. Pat. No. 9,734,350 issued Aug. 15, 2017, which is related to, and claims priority to, U.S. patent application Ser. No. 13/855,761, with a filing date of Apr. 3, 2013, now U.S. Pat. No. 9,100,183 issued Aug. 4, 2015, which is related to, and claims priority to, U.S. patent application Ser. No. 13/579,934, with a filing date of Nov. 4, 2012, now U.S. Pat. No. 9,059,851 issued Jun. 16, 2015, which is related to, and claims priority to, national phase application of PCT Patent Application No. PCT/IB11/50726, with an international filing date of Feb. 22, 2011, which is related to, and claims priority to, U.S. Provisional Patent Application No. 61/307,079, with a filing date of Feb. 23, 2010, all of which the entire contents are incorporated herein by reference.

TECHNICAL FIELD

Embodiments of the invention relate generally to the field of data encryption, and more particularly, to order preserving encryption and for an encryption dictionary that facilitates order preserving encryption.

BACKGROUND

Currently there are no known solutions that enable sorting of encrypted data, and encryption is usually done on the data being stored to a storage area or on information transmitted between two parties. In both cases before the data is process by the application it must be decrypted.

All known existing solutions to secure data sent to a Software as a Service (SaaS) application, secure the pipe between user (end-user or the enterprise network) and the service, and rely on the security provided by the SaaS vendor. However, the SaaS user does not control his sensitive data, and in case there is leakage of information from the SaaS provider, confidential data may be exposed. Furthermore, standard encryption solutions do not enable the SaaS application to process the encrypted data content, i.e. to perform operations like search, sort, making reports on the encrypted data content.

There is a need to enable the usage of external resources such as SaaS applications and cloud computing services while ensuring the confidentiality and privacy of the user/corporate sensitive data.

SUMMARY OF THE INVENTION

A method for generating an encryption dictionary, the method comprises: generating a random value for each plaintext symbol of multiple plaintext symbols; and calculating a random token for each plaintext symbol based on a random value of the plaintext symbol and on random values of other plaintext symbols that have a lower lexicographic value than the plaintext symbol; wherein the calculating comprises applying a monotonic function; wherein the encryption dictionary comprises a mapping between the multiple plaintext symbols and random token of the multiple plaintext symbols.

A method for processing symbols by a first computerized entity, the method comprising: receiving, by a first computerized entity and over a communication network, text that comprises multiple random tokens and a plurality of plaintext symbols; wherein the multiple random tokens are generated by a second computerized entity; wherein a value of each random token that represents a plaintext symbol is responsive to values of random tokens that represents plaintext symbols that have a lower lexicographic value than the plaintext symbol; and processing the text by the first computerized entity.

A non-transitory computer readable medium that stores instructions for: generating a random value for each plaintext symbol of multiple plaintext symbols; and calculating, using a monotonic function, a random token for each plaintext symbol based on a random value of the plaintext symbol and on random values of other plaintext symbols that have a lower lexicographic value than the plaintext symbol; wherein the encryption dictionary comprises a mapping between the multiple plaintext symbols and random values of the multiple plaintext symbols.

A non-transitory computer readable medium that stores instructions for: receiving, by a first computerized entity and over a communication network, text that comprises multiple random tokens and a plurality of plaintext symbols; wherein the multiple random tokens are generated by a second computerized entity; wherein a value of each random token that represents a plaintext symbol is responsive to values of random tokens that represents plaintext symbols that have a lower lexicographic value than the plaintext symbol; and processing the text by the first computerized entity.

A system, comprising a first computerized entity for: receiving over a communication network, text that comprises multiple random tokens and a plurality of plaintext symbols; wherein the multiple random tokens are generated by a second computerized entity; wherein a value of each random token that represents a plaintext symbol is responsive to values of random tokens that represents plaintext symbols that have a lower lexicographic value than the plaintext symbol; and processing the text by the first computerized entity.

A system comprising a second computerized entity for generating a random value for each plaintext symbol of multiple plaintext symbols; and calculating a random token for each plaintext symbol based on a random value of the plaintext symbol and on random values of other plaintext symbols that have a lower lexicographic value than the plaintext symbol; wherein the calculating comprises applying a monotonic function; wherein the encryption dictionary comprises a mapping between the multiple plaintext symbols and random token of the multiple plaintext symbols.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
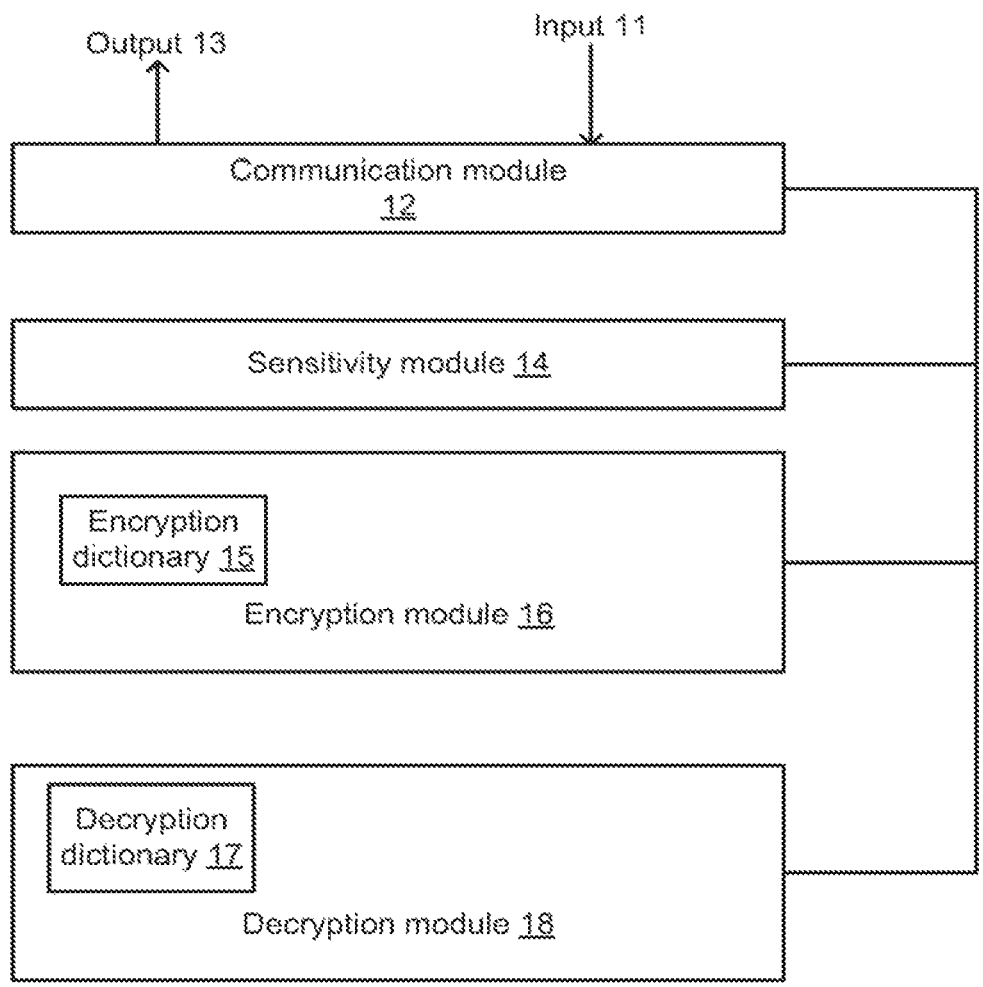
FIG. 1 illustrates a security module according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Any combination of any of the claims of this applications can be provided.

There is provided an appliance, a system, a method and corresponding software components for symbol based encryption of data. According to some embodiments of the present invention, there may be provided a symbol based encryption module (hereinafter—encryption module) adapted to encrypt data (such as data included in a file), such as a document or an application request/transaction, on a per symbol basis.

The term symbol may be defined as a word, a phrase, a number or any set of characters including alphanumeric characters in any known language. The terms symbol and data elements shall be interchangeable through this application.

The terms data file and document shall be interchangeable throughout this application.

The encryption dictionary can be a data structure of any format.

The terms plaintext, un-encrypted, decrypted and non-encrypted shall be interchangeable throughout this application.

The term "random token" may mean a data element that is generated by a process that includes at least one stage that is random or pseudo-random.

According to an embodiment of the invention there is provided a sort and search preserved encryption module that may provide sort and search preserving encryption that allows other modules (or other computerized entities) that may not be aware of the plaintext symbols to sort random tokens, to search for random tokens and even to perform both sort and search processes. The terms "search and sort preserve encryption" and "order preserve encryption" shall be interchangeable throughout this application.

The computerized entities and methods illustrated below can be used in various environments and operate in various scenarios. For example, when a corporate is using a Customer Relationships Management (CRM) in the Software as a service (SaaS) model such as salesforce.com, the data sent to salesforce.com servers may contain sensitive data elements. A computerized entity can understand the salesforce.com application protocol, detect the sensitive data elements in an HTTP requests sent to the salesforce.com application, and encrypt these elements utilizing a symbol based encryption that can be a sort and search preserved encryption.

Thus, the HTTP request structure remains the same, and only the sensitive data elements are replaced with the encrypted elements, and as a result, the salesforce.com application can process the request as a normal request. The sort and search preserved encryption enables the salesforce.com application to search within the encrypted data elements (e.g. to search for a contact given its name), to sort the encrypted data elements (e.g. to sort the contacts names in a lexicographic order), and to prepare reports using the encrypted data elements, while the values of the sensitive data elements processed and stored in the salesforce.com databases encrypted. Thus, even if there is a leakage of information from the salesforce.com server-side applications and databases, there is no exposure of corporate sensitive information.

According to some embodiments of the present invention, when the user is retrieving a web page that contains an encrypted element, a decryption module that may reverse the operation of an encryption module may detect the encrypted element(s) in the web page returned by the web-application (e.g. the SaaS application) and may decrypt them. Thus, the web page received by the user/user-browser may contain a non-encrypted/plain-text response page, and all the information presented to the user may be in plaintext.

According to further embodiments of the present invention, a user requesting to export the data stored in a web-application to any text based file (e.g. a word document, an excel document) or even a PDF file, the returned file may be processed by the device(s) in order to detect the sensitive elements in the text file and optionally replace them by their plaintext value. Thus, the exported file may be in plaintext.

In most of the cases textual sensitive data elements are not used for any numeric analysis, and as a result, their encryption, doesn't affect the SaaS application functionality, since the encryption applied to these textual sensitive data elements preserve the ability of the SaaS application to search of sort the encrypted data elements. For example, in a CRM application, the name of customer who made the call is not important to the analysis of the call center performance, and thus the fact that it is encrypted doesn't prevent any analysis done by the CRM application. In contrast, the call duration, and the waiting time are necessary for the numeric analysis of the call center performance and they of course are not encrypted since they are not considered as sensitive data elements (according to the regulations).

In order to preserve the functionality of the application, the suggested encryption scheme encrypts the sensitive elements that don't affect the application functionality, and the encryption of sensitive data elements is done in a transparent way from the SaaS application perspective, in order to prevent any need for changes in the SaaS application. To achieve this goal, the device encrypts each word/phrase in a data element by itself and in a way that preserves the search and sort functionality of the SaaS application on each data element (word/phrase).

To preserve the ability to sort the encrypted values and to search within the encrypted data elements, the encryption scheme replaces each data element with a random token in such a way that the lexicographic order between the random tokens preserve the order e.g. the lexicographic order between the plaintext data elements they represent.

According to various embodiments of the invention the encryption module can define a space of possible random tokens, and generate random tokens within that space.

The space of possible random tokens can be of any size. The size of this space can be determined according to the number of possible different plaintext data elements to be encrypted. This space can be span by random tokens of a length that can be 64 bits, 128 bits or any other size.

Based on the size of the random tokens the encryption module generates random tokens for the plaintext symbols so that the order, e.g. the lexicographic order, between the random tokens generated for the data elements in the encryption dictionary preserves the order between the clear-text data elements they represent. This mapping between the random tokens generated and their corresponding clear-text data elements may be stored in a hash table in memory and, additionally or alternatively, in a database.

Each plaintext symbol can be mapped to one or more random tokens.

When the encryption module needs to encrypt a data element, the encryption module can execute the following stages:

a. It searches the encryption dictionary to see if there is already a random token associated for this data element.
b. If there is a random token then the encryption module uses the random token.
c. If there are few random tokens for that data element the encryption module can select one of them, in a random or other manner.
d. If there is no random token for this data element then the encryption module generates a new random token for the new data element and updates the encryption dictionary accordingly.
e. The new random token can be generated in the following way: (i) the encryption module searches the encryption dictionary for a data element that is just before the new data elements and another data element that is just after it according to the lexicographic order of the data elements, (ii) the encryption module extracts the random tokens that correspond to these existing data elements and according to the distance of the new data element (of the random token or random value assigned to the to the data elements) before and after it the encryption engine generates a random token that is between the random tokens of these elements, and (iii) the newly generated random token is used to encrypt (i.e. replace) the data element and is stored in the encryption dictionary (and may also be stored in one other database).

It is noted that since a random token is associated with each plaintext element the search capability is preserved.

It is noted that the encryption module requires a definition of the sorting method. In case of textual (alpha-numeric) data elements the lexicographic sorting is assumed as default. However, it is noted that the encryption module can generate random tokens that preserve orders that differ from lexicographic orders. Thus, if a set of data elements are orders according to a certain order (and are associated with ascending or descending values) than any of the mentioned below methods can be applied to provide an order preserving encryption.

According to an embodiment of the invention the first letter of a data element can remain non-encrypted (while other letters are encrypted) so that an application that receives the random tokens can still be able to present all the data elements starting with A, B, C . . . Z.

According to an embodiment of the invention multiple random tokens can be assigned to a single plaintext data element. Such an allocation can be provided for various reasons such as but not limited to a need to smooth (or flatten) an uneven distribution of data elements. This may occur if there are popular data elements (i.e. data elements that appear frequently in the plaintext).

When multiple random tokens are generated for a single plaintext data element these random tokens can be consecutive (from lexicographic order perspective), but from the random token perspective there may be no sign that these random tokens correspond to the same plaintext element.

When searching for a plaintext data element that was encrypted using "multiple substitutions" the encryption module should search for all the random tokens that correspond to the plaintext data element, using an OR operation.

According to an embodiment of the invention the number of random tokens per plaintext data element can be stored in multiple manners. For example, the number of random tokens of plaintext data elements that have multiple random tokens are stored in the encryption dictionary or in another data structure. Yet according to an embodiment of the invention separate encryption dictionary can be allocated for plaintext data elements that have multiple random tokens.

In order to define the space of the random tokens the size and number of the possible data elements (i.e. the possible number of first names, last names, etc.) should be estimated. If an exact estimate is not provided than at least a gross estimate can be provided—such a gross estimate can provide an order of magnitude (i.e. thousands, tens of thousands, hundreds of thousands, millions, tens of millions etc.).

The data elements to be encrypted are usually of a known type. They are usually fields in a structured text that are known in advance. It is noted that the sensitivity detection mechanism can detect sensitive data elements in a non-structured data in a mechanism similar to a DLP mechanism. Non-limiting examples of such fields can include a name of a person, a name of a company, a bank account number, a credit card number and the like. The size of the space of the plaintext elements to be encrypted may be finite and as a result tokenization can be applied.

For example, if the data elements to be encrypted are names of people then a reference to the number of different names can be found, for example in http://www.census.gov/genealogy/names/. For example, in order to provide 90% coverage of first and last names in the United States of America there is a need to allocate 4,250 female names, 1,250 male names and 88,000 last names. In this case 20 bits (spanning a space that is about million possibilities) may be enough to cover the space of first and last names of people, and we can use these names to build our initial dictionary of random tokens.

If, for example, the characteristics of the data elements to be encrypted are unknown (e.g. names of projects or companies), the encryption module can generate an (initial) encryption dictionary that include multiple combinations of letters. For example, such an initial encryption dictionary can include all tuples of three or four characters of the alphabet.

For a given space estimation, the random token should be much larger (for example—at least 40 bits larger) than the size of the plaintext elements to be encrypted. Thus, if the estimated space of the plaintext elements in 20 bit (around one billion) then the random tokens should be, for example, 64 bits long.

In the generation of the initial mapping the encryption module can use the output of a random or pseudo random generator. The pseudo random generator can be an output of an AES encryption algorithm in CBC mode or in CTR mode, where the key and the IV are randomly generated using a hash function on some data gathered.

The encryption module may sort the plaintext data elements in the initial encryption dictionary, and processes them one by one according to their order.

For each plaintext data element, the encryption module generates at least 40 bit random value (random number) and translates it to an integer number. Then the encryption engine adds the random values associated with all the plaintext elements till that data element (including the random value generated for that data element) to generate the random token for that data element. For example:

a. For the first plaintext data element, the random token is the number generated for this plaintext data element.
b. For the second plaintext data element, the random token is the sum of the random values generated for the first two plaintext data elements.
c. For the third plaintext data element, the random token is the sum of the random values generated for the first three plaintext data elements.
d. For the N plaintext data element, the random token is the sum of the random values generated for the first N plaintext data elements.

According to an embodiment of the invention the encryption dictionary can be stored in one or more data structures, can be at least partially replicated, can be stored in a hierarchical memory data structures, can be at least partially stored in cache, and the like. Once a new random token is generated it can be stored in one data structure and then be updated to another data structure if necessary.

The random token generated by the encryption module can be encoded utilizing hex encoding using the first 16 alphabetic characters according to their lexicographic order so that each 4 bits of a numerical value of the random token are represented by a letter between a and p.

These letters can be converted to upper case letters and lower case letters by using letter case information representative of the types of letters (lower case or upper case) of the plaintext data element that is being encrypted.

Alternatively, each 5 bits of a numerical value of the random token are represented by an Armenian letter (having 36 letters). This encoding can also preserve the letter case of the original data element.

Case preserving encoding allows an application (such as a SaaS application) to choose case sensitivity of sorting and searching according to its needs, transparently of encryption.

In many cases such as a search operation the operation is required to be case insensitive, and as a result the search engine is translating both the data to be searched and the search term into lower case before the search operation. As a result, the suggested encryption also translates the plaintext data elements, and the search terms into lower case, before encrypting them. This ensures that the search done on the random tokens will be case insensitive.

In order that when a data element is decrypted the decryption module will preserve the case sensitivity of the original data element, the encryption algorithm generates letter case information that indicates which character is upper case and which is lower case.

Before the encryption module encrypts a plaintext data element, it may generate a bit vector that may include 1 for an upper case letter characters and 0 for lower case letter character, digits and additional characters (or use any other values that differ from each other). Then the encryption module can translate the data element into lower case characters (if applicable) and generates a random token for the data element as described above.

The encoding of the random token may be done utilizing an encoding (such as a hex encoding) using the first 16 alphabetic characters according to their lexicographic order (i.e. 0 will be encoded by the lowest character in the alphabet). The characters used are lower case a-p characters, but can be any set of 16 characters that are ordered lexicographically and have upper case and lower case representation.

Then the encryption module may convert the characters to upper case using the bit vector that was generated before the data element encryption. Thus, for each 1 bit in the bit vector the corresponding character is translated to upper case.

For example, if the word was "David" the first character in the encoded random token will be upper case and all the rest of the characters will be lower case.

When a decryption module decrypts a random token into the plaintext data element it reverses the above process. Before the decryption, the encryption module generates a bit vector that contains 1 for an upper case letter characters and 0 for lower case letter character (or use any other values that differ from each other).

Then it translates the random token into lower case characters, and searches for the plaintext data element in the encryption dictionary. The plaintext data element found is in lower case.

Then the decryption module converts the characters to upper case using the bit vector that was generated before the random token decryption. Thus, for each 1 bit in the bit vector the corresponding character in the plain-text data element is translated to upper case.

In cases where the initial encryption dictionary (that may be used for the sort preserved encryption) is based on all the tuples (i.e. all the permutations) of 4 characters of the alpha-Beth, then when the user enters the first characters of the word for which it is required to provide auto-complete the device can look for this character string in the internal dictionary as well as for the next tuple with the same number of characters, and find their random tokens.

For example:
a. When the user enters the letter C we would look for the encryption of C and D.
b. When the user enters the letters CA we would look for the encryption of CA and CB.
c. When the user enters the letters CAR we would look for the encryption of CAR and CAS.
d. When the user enters the letters CARL we would like for the encryption of CARL and CARM.

In each of the above cases an application server (e.g. the SaaS application server) may be requested to bring all the values that are greater or equal to the encryption of the string entered by the user and are smaller than the encryption of next string in the (lexicographic) order. Since the encryption is preserving the order this will bring all the strings that start with the character entered by the user.

In case the username is composed from few elements separated by "." or "-" then each element can be encrypted separately.

According to an embodiment of the invention emails (or other plaintext data elements having a predefined format) can be encrypted in a format preserving manner.

In case the SaaS application is performing a format validation at the server side, then an encryption scheme that preserves the data element format can be applied. However, if the format validation is done on the client side, then the device can use any encryption scheme even if it doesn't preserve the format in case using this encryption scheme can be more secure and more efficient to implement.

For example, an email address is usually composed from two plaintext strings that are separated by an at sign (@) (i.e. user-name@domain-name.com), the encryption module may encrypt the user-name by itself and the domain name by itself, and recomposes the new email address using the encrypted values of the user-name and the domain-name.

Thus, an email address can be converted to an encrypted email address that includes two random tokens (RT(q) and RT(j)) that are separated by an at sign (for example RT(q) @RT(j)).

This preserves the structure of the email address, enables sorting of encrypted email addresses, and ensures the confidentiality of both the user name and the domain name.

Yet according to another embodiment of the invention an email address that includes two plaintext strings that are separated by an at sign is converted to an encrypted email address that includes two random tokens that may be separated by a symbol and are followed by an at sign, wherein the at sign is followed by a predefined domain name that identifies a computerized entity owned by the device, i.e. the enterprise that is arranged to assist in decrypting the encrypted email address (RT(q).RT(j))@predefined_domain_name) and the email message body. This also enables the device to catch emails sent to the encrypted email address.

The computerized entity may decrypt the encrypted email address and the email message body or send it to a decryption module. After the email is decrypted it (and the email message associated with it) are sent to the destination defined by the email address.

If email addresses are encrypted according to one of these embodiments then the decryption module can search for expressions like (a) RT(q)@RT(j) (encrypted-value@encrypted-value), decrypt each of the random tokens, and recomposes the email address using the plaintext values for the user-name and the domain-names, or (ii) RT(q).RT(j))@predefined_domain_name.

According to an embodiment of the invention different mapping between plaintext data elements and random tokens can be provided for different users, devices, applications, and the like.

According to an embodiment of the invention different encryption policies and different encryption dictionaries can be used in different contexts.

For example, an encryption module (or different encryption modules) can apply a different encryption-policy (that define which data elements should be encrypted) for each SaaS application. Thus, for certain functionality the device will have to be familiar with the SaaS application protocol. (Note: The knowledge on the SaaS application protocol will be gathered by an off-line process.)

In addition, a SaaS application may provide a very detailed API that enables developers to develop their own applications on top of that SaaS application services. This APIs which defines the meaning and the semantic of each parameter in that SaaS application, may enable to prepare a detailed policy for that SaaS application, and for each application developed on top of it APIs since the device intercept the calls to the APIs and will apply the privacy policy to the parameters according to the application security policy for the requested APIs.

According to an embodiment of the invention a device is provided. The device can include the encryption module (and, additionally or alternatively a decryption module) and can act as a proxy or a reverse proxy between a SaaS application client (running usually in the end user browser) and a SaaS application server side, running on the SaaS provider servers. As a proxy or a reverse proxy all (or a part) of the traffic between the SaaS application client side and the SaaS application server side can be monitored (requests and responses).

The device can detect the application according to the domain name in the request. According to the URL the device detects the request type, and according to the request type, it "knows" (per a predefined definition) what sensitive data elements that should be encrypted are included in the request.

Since the requests are usually HTTP request, which are using key-value pairs, the device can easily detect the relevant parameters by their names, and replaced their value in the request with the encrypted value. In case it is a post request with a XML body, the device may use a XML parser to query and extract the value of the sensitive data elements and replace their plaintext value with the encrypted value. In case it is a post request with a JSON body, the device may use a JSON parser to extract the value of the sensitive data elements and replace their plain-text value with the encrypted value. The device can handle requests that their body is a combinations of key value pairs, XML and JSON, as well as other formats and detect in these requests the sensitive values.

In order to enable easy detection of the textual encrypted value in the response the device may add a prefix and a suffix to each encrypted element (as will be explained later).

In case a textual search request is detected, the device may detect the textual search text in the request, and the device applies the same encryption to search terms in order to preserve the server or the application search functionality.

When the response is returning from the SaaS application, it is usually a web page. In order to ease the detection of textual encrypted elements, each encrypted element has a unique prefix and suffix. The device may be using this prefix and suffix to detect the textual encrypted elements in the web page and replace them with their plaintext values. The same apply to XML documents and JSON responses that returned as a response and/or to textual files and/or to documents that are downloaded from the SaaS provider server.

As explained above the device may function as a proxy or a reverse proxy between the client side application running usually at the user's browser and the application server side running on the SaaS provider servers. In case of a corporate it makes a lot of sense to position the device in the corporate network perimeter close to the firewall. The advantage of this position is that only users that work within the enterprise network can work with the application normally and any users that are not passing through the device will view only the encrypted data elements. This enables the enterprise to audit the access to the application, and prevent any unauthorized access to the application from outside of the corporate network, since even if the user has somehow a username and password to the application, he/she would see only the random tokens and the sensitive data will not be exposed.

This topology may handle scenarios of an ex-employee that have left the organization, but for some reason was not deleted from the SaaS application users list. This topology also handles the scenario where somehow a username and password of the application were revealed to an unauthorized user outside of the enterprise.

Another advantage of this topology is that the enterprise has full control on the device, and the device secret keys including the encryption dictionary remains with the enterprise. As explained above the device enables the corporate IT or the compliancy officer full control on the privacy policy enforced by the device.

In order to enable remote users to work properly with the SaaS application they will have in this topology to connect to the enterprise network using SSL VPN, and work though the enterprise network.

This proxy can be implemented as software running on the end-user's desktop/laptop, to address to consumer market.

The device/appliance can be running Linux (as its Operating System).

On the Linux, an Apache can run in proxy/reverse-proxy mode as a HTTP/HTTPS proxy server (utilizing the Apache mode_ssl). The device can run other proxies to support other protocols as well.

The encryption/decryption module can be running as an Apache module.

The appliance can have a web based GUI for various management activities.

The system or appliance may include a web based GUI will enable the user to define the privacy policy, and to manage the device secret key.

The device may have: (i) A secret key management GUI that will be available only to very minimal number of users; (ii) policy management GUI that will be available to policy administrators; wherein for each application supported by the device will have a dedicated GUI that will be tailored to the specific application.

The policy screen will enable the policy administrator to define which data elements are sensitive data elements, and how to encrypt them (i.e. what encryption engine to use).

For example, a file that is attached to an email can be encrypted as one entity to achieve additional security, and only the name of the file should be encrypted using the search and sort preserved encryption scheme.

The illustrated devices and methods can provide to the device administrator full control of the information that is sent out-side from the enterprise network e.g. to the SaaS provider (i.e. control what can go to the SaaS and what cannot), and minimize the exposure of enterprise confidential data, it can enforce the enterprise data privacy policy, and enable the compliance officer to easily define and enforce a corporate policy regarding: (i) Data that can be exported externally—the security/compliancy officer can define that certain data elements (e.g. credit card numbers) should be masked before being sent out side of the enterprise (due to PCI-DSS compliancy); (ii) Data that should be secured—although the device provides predefined configuration of sensitive data elements for different SaaS applications, the security/compliancy officer can modify it to tailor it to the enterprise security policy.

The described methods and devices can enable CXO to use the SaaS model to reduce costs by using SaaS application without exposing confidential data and as a result without risking privacy regulations. They allow jurisdiction definition and simplify/reduce audit requirements. They reduce recurring compliance audit costs of SaaS solutions, and reduce the need for auditing the SaaS provider.

In case of any SaaS related security breach, no notification will be required to customers according various regulations (e.g. CA SB 1386 (2003)), since the sensitive and privacy related data was encrypted.

The methods and device may allow monitoring and Audit SaaS usage and SLA, may enable monitoring of SaaS applications usage by the enterprise, may enable enforcement of enterprise specific access control policy on SaaS usage by users, can detect abnormal usage of SaaS applications and may monitor SaaS application availability and response time, can enhance the attractiveness of SaaS applications by overcoming one of the major prospects' inhibitor which is the privacy and confidentiality of the data, can reduce liability in case of data exposure—since the sensitive information is encrypted even if the information leak that is no damage. The suggested encryption, even if it does not eliminate any other security measured that should be taken by the enterprise, it is still the last defense in case all the other defense layers have failed.

The methods and devices described herein illustrate some of the benefits of using the sort and search preserved encryption method for SaaS application scenarios. However, there are various additional business applications that can benefit from it, such as cloud computing and internal usage of the device within the enterprise to protect the data stored within the organization storage and/or database from any unauthorized use.

FIG. 1 is a block diagram of a security module 10 according to an embodiment of the invention.

It is noted that the security module 10 can include software components, hardware components and the like. The security module 10 or one of more of its components (hardware, software or a combination thereof) can be regarded as a second computerized entity, and can be a device. A first computerized entity can be arranged to utilize the random tokens generated by the security module 10. The first computerized entity can be a SaaS application, a server running the SaaS application and the like.

The security module 10 can have at least one input 11 and at least one output 13. These inputs and outputs can represent physical communication links, virtual communication links or a combination thereof.

The input 11 can receive text and the output 13 can output encrypted text. The received text can include plaintext symbols while the encrypted text can include random tokens representative of some of the received plaintext symbols. The encrypted text can include a combination of plaintext symbols and random tokens—thus only a part of the received text can be encrypted.

The security module 10 includes a communication module 12 that is arranged to receive data elements and can output data elements and random tokens. The communication module 12 can include one or more proxies such as but not limited to HTTP proxy, SMTP proxy, pop3 proxy or any other proxies.

The communication module 12 is coupled to a sensitivity module 14 that may select plaintext symbols to be encrypted and send these plaintext symbols to an encryption module 16. The sensitivity module 14 can receive instructions relating to which fields of the text to encrypt.

The sensitivity module 14 may be integral or otherwise functionally associated with the encryption module 16. The sensitivity module 14 may estimate or determine (based on a pre defined security policy) the sensitivity level of some given data (i.e. symbol or group of symbols) and may indicate to the encryption module 16 whether or not to encrypt the given data-element/symbol(s) and how the encrypt the given data element/symbol. The higher the sensitivity level of the given data, the more likely it will be encrypted. The sensitivity module 14 may be adapted to detect and classify the sensitivity level of some or all symbols or groups of symbols of a data file/document or application request/transaction (for example peoples' names, addresses, account information, etc.) based the symbol(s) data format or other characteristics. According to yet further embodiments of the present invention, there may be provided templates or configuration files associated with each type of data file/documents or application's messages which templates of configuration files may indicate to the sensitivity module 14 data/symbol characteristics or parameters of data/symbols found in the file/document or application's messages type to be classified as sensitive.

According to yet further embodiments of the present invention, an encryption module's decision as to whether or not to encrypt a given data/symbol may be influenced by an indication (e.g. user defined) of a security level for the entire file or document or application message (e.g. request/transaction). Accordingly, the same data/symbol considered sensitive and in need of encryption when found in a document classified as having a high security level may be considered non-sensitive, and thus not encrypted, when found in a document having a lower indicated security level.

The encryption module 16 may perform the search and sort preserve encryption to provide random tokens. The random tokens and plaintext symbols (that were not selected to be encrypted by the encryption module 16) can be sent by the communication module 12 to a first computerized entity such as a SaaS server.

The encryption module 16 may perform one or more encryption operations such as but not limited to the encryption methods illustrated in the following figures. For example, the encryption module 16 can perform the symbol based encryption illustrated in the following figures as well as other encryptions such as standard encryption based on, for example, on NIST—standard algorithms and best practices and the like. The encryption module 16 can perform case preserving encryption (using case type information), case sensitive encryption (i.e. encrypting the plain text symbol as it is), search enabled encryption, sort and search enabled encryption, standard block encryption algorithms such as AES in CBC mode,—wherein non-limiting of such encryption methods are illustrated in the following figures.

The encryption module 16 can be used to encrypt only selected data elements. The data elements may be selected based on their sensitivity. The sensitivity can reflect a security level of a data element, damage that may result from an exposure of the data element, value of the data element and the like. The sensitivity can be determined in advance, be calculated by applying a function, can be updated over time, and the like.

FIG. 1 also illustrates an encryption dictionary (encryption dictionary) 15 that can be accessed by the encryption module 16.

Either one of the sensitivity module 14 or the communication module 12 can be familiar with ("understand") the application protocol, in order to extract and allow the sensitivity module to detect which plaintext symbols to send to the encryption module.

The security module 10 can be used in various scenarios, including but not limited to SaaS providers that should not be aware to the plaintext symbols that were encrypted.

The sensitivity module 14 (or another module such as a communication module 12) may intercept application request messages that are sent to an application server, and send selected plaintext symbols to the encryption module 16, if these plaintext symbols are sensitive enough.

The encryption module 16 may encrypt the plaintext symbols selected by the sensitivity module 14 before they are sent to a SaaS provider.

As a result—sensitive data elements are encrypted before being sent to, processed by and stored in the SaaS application database, while the SaaS application functionality is preserved, and without any need to change the SaaS application.

According to some embodiments of the present invention, the encryption module 16, and other associated components (such as software components), may be implemented anywhere along a data file or document generation/storage chain, or the route from the end user device (e.g. browser) to the (SaaS) application server.

According to an embodiment of the invention, the encryption module 16 may be integral or otherwise functionally associated with a computational platform (e.g. plug-in or add-on) on which an application used to generate documents (e.g. MS Word) runs. When the document is saved by the application, it may be automatically symbol based encrypted by the encryption module as part of the saving process.

According to some embodiments of the present invention, some or all of the functionality of the encryption module 16 may be executed using a removable peripheral (e.g. USB device), where the peripheral may include data storage and encryption logic.

According to some embodiments, the encryption module 16 as well as the sensitivity detection module 14 may be integral or otherwise functionally associated with an organization's document repository (e.g. document management system running on an organization's server), such that all documents stored on the repository are encrypted as they enter the repository.

According to yet further embodiments of the present invention, the encryption module 16 may be integral or otherwise functionally associated with an organizational gateway to an external document repository (e.g. document management system running on a third party server) provided by a document repository services provider (e.g. Google, Iron Mountain, etc.)

According to embodiments of the present invention where the encryption module 16 is associated with either a data server or with a gateway to an external application server (e.g. a SaaS application server), the encryption module 16 may be functionally associated with a communication module 12 that is adapted to receive and send network data traffic.

The communication module 12 may include networking hardware and network protocol logic (e.g. TCP/IP stack) adapted to receive and transmit data using any network standard known today or to be devised in the future.

As part of the encryption module's operation, the encryption module 16 may utilize an encryption dictionary such as an encryption dictionary that maps plaintext symbols to random tokens. It is noted that the encryption module 16 may encrypt only a portion (and even only a small portion) of a text so that random tokens as well as plaintext symbols can be sent to a computerized entity that is unaware to the plaintext symbols that were encrypted and/or replaced by random tokens.

According to embodiments, the random token may have no meaning whatsoever—thus the random token does not provide a meaningless phrase or expression.

According to an embodiment of the invention the encryption module 16 applies a search and sort preserving encryption that is order preserving in the sense that the order of plaintext symbols are the same to the order of the random token that represent these plaintext symbols.

According to yet further embodiments of the present invention, each user and/or organization may be associated with a different and substantially unique encryption dictionary.

The encryption dictionary 15 may be a dynamically updatable table and may be updated during operation. For example, when a user/organization starts using an encryption module 16 according to some embodiments of the present invention, the encryption dictionary 15 for the given user/organization may include mappings for a set of symbols likely to be found (e.g. statistically often used) within documents used by the user/organization.

When during operation, however, the encryption module 16 receives a new plaintext symbol that is not currently included in the encryption dictionary the encryption module 16 can update the encryption dictionary 15 by adding a random token that represents the new plaintext symbol while preserving the order of the random tokens. A non-limiting example of such an update is provided in FIG. 7.

If a document to be encrypted includes a plaintext symbol that does not have a corresponding mapping entry in the encryption dictionary 15, then the encryption module 16 or another associated software component may generate (for example, by using a random symbol generator) a corresponding cipher entry (a new mapping between the new plaintext symbol and a new random token) and may update the encryption dictionary 15 accordingly. Thus, an encryption dictionary 15 used by a user or organization may grow as more traffic is passing through the device. The encryption dictionary 15 may be stored within a database that can be part of a device and/or the system that implements the invention.

According to some embodiments of the present invention, utilizing an encryption dictionary 15 may result in a sort and search preserved encryption of some or all of a document's encrypted data/symbols. Accordingly, textual search and sort functionality of a remote service, server and/or application based, is preserved and can be applied to the random tokens. Thus, the remote service, server and/or application can sort the random tokens, and when the sorted random tokens are returned to the user and the random tokens are converted into their plaintext symbols the result is a sorted plaintext symbols. In addition, a document search engine or utility according to the present invention may scan through a set of documents encrypted according to embodiments of the present invention and may search for one or more search terms by running the search query via the encryption module that converts the search terms (i.e. symbols) to their corresponding random tokens using the same encryption dictionary as used to encrypt the documents, and then the first computerized entity can perform the search query on the documents based on the encrypted/converted search symbols.

According to further embodiments of the present invention, there may be provided a decryption module 18 that may reverse the operation of the encryption module 16. FIG. 1 illustrates the decryption module 18 as being included in the security module 10 but this is not necessarily so and the encryption and the decryption can be executed by multiple distinct computerized entities.

Decryption module 18 can be adapted to use either one of the encryption dictionary 15 or a reverse encryption dictionary 17. It can use either one of these data structures when decrypting files/documents that were previously encrypted according to some embodiments of the present invention.

The decryption module 18 associated with a given encryption module 16 may be adapted to either use a decryption dictionary 17 that can be an inverse encryption dictionary relative to the encryption dictionary 15 used by the encryption module 16 or to perform a reverse lookup on the same encryption dictionary 15 as the one used by the encryption module 16. However, if the encryption and decryption modules are using different encryption dictionaries then the dictionaries used for encryption and decryption have to be synchronized.

Upon retrieval of the encrypted data, and/or data which is the result of a manipulation of the encrypted data by the remote service, server and/or application, the decryption module 18 may be adapted to decrypt the one or more random tokens by utilizing the inverse of the encryption dictionary 16 that was used for the encryption which they are a result of, into their corresponding 'clear' symbols prior to output/presentation to the user. The decryption module 18 may scan the returned text to detect the encrypted elements included in that text and replace them with their corresponding plaintext elements.

According to some embodiments of the present invention, the encryption/decryption modules 16 and 18 may be functionally associated with applications including word processing applications, accounting applications, email applications, spread sheet applications, CRM applications, etc. According to further embodiments of the present invention, the encryption/decryption modules 16 and 18 may be functionally associated with "Software as a Service" applications provided by third parties over the internet or other distributed data networks.

By exercising the symbol based encryption illustrated in any of the following methods as well as the symbol based decryption external resources such as SaaS applications and cloud computing services can be used while ensuring the confidentiality and privacy of the user/corporate sensitive data.

The mentioned above security module 10 is capable of applying sort and search preserved encryption methods that may enable a SaaS application to sort the encrypted data elements as well as to search the encrypted data elements although the data elements are encrypted. In addition, our innovation enables to detect and decrypt encrypted elements on various formats of documents as well as in various protocols (e.g. SMTP, HTTP) in order to ensure transparent functionality to the user. This enables the users of such a technology to maintain their customers' privacy, without the need to change the SaaS application.

Figure 2:
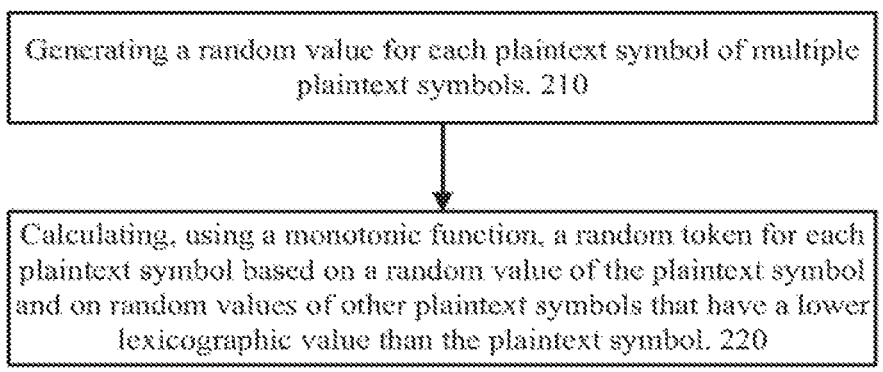
FIGS. 2-7 illustrate various methods according to various embodiments of the invention.

FIG. 2 illustrates a method 200 for generating an encryption dictionary, according to an embodiment of the invention.

The encryption dictionary includes a mapping between multiple plaintext symbols and random tokens that represent the multiple plaintext symbols Method 200 may start by stage 210 of generating a random value for each plaintext symbol of multiple plaintext symbols.

Stage 210 may include applying a random or a pseudo-random process. Random values RV(1)-RV(n) are calculated for plaintext symbols PS(1)-PS(n).

The plaintext symbols can be, for example, private names such as Bob, John, Rob and Helen. After being sorted these private names are ordered accordingly: Bob, Helen, John and Rob. Four random values RV(1)-RV(4) are calculated for these four names.

The plaintext symbols may include letters, numbers or a combination thereof. The random values can be numerical values.

Stage 210 may be followed by stage 220 of calculating, using a monotonic function such as an increasing monotonic function, a random token for each plaintext symbol based on a random value of the plaintext symbol and on random values of other plaintext symbols that have a lower lexicographic value than the plaintext symbol. Thus, assuming that PS(1)-PS(n) are lexicographically ordered, then the k'th random value (k ranges between 1 and n) is responsive to the first random value till (k)'th random value. For example, the k'th random value is an outcome of a monotonic function that is applied on the first till k'th random values. The monotonic function can also be a decreasing monotonic function—but in this case the order may be reversed and an additional order reversing operation may be applied.

According to an embodiment of the invention stage 220 includes calculating the random token (RT) of a plaintext symbol by summing the random values of other plaintext symbols that have a lower lexicographic value than the plaintext symbol. Thus RT(k)=SUM (RV(1) . . . RV(k)), for each value of k between 1 and n.

For example, the random token RT(1) of Bob will equal RV(1), the random token of Helen RT(2) will equal RV(1)+RV(2), the random token of John RT(3) will equal RV(1)+RV(2)+RV(3), and the random token RT(4) of Rob will equal RV(1)+RV(2)+RV(3)+RV(4).

According to another embodiment of the invention stage 220 may include calculating the random token of the plaintext symbol by applying a weighted sum of the random values of other plaintext symbols that have a lower lexicographic value than the plaintext symbol.

Figure 3:
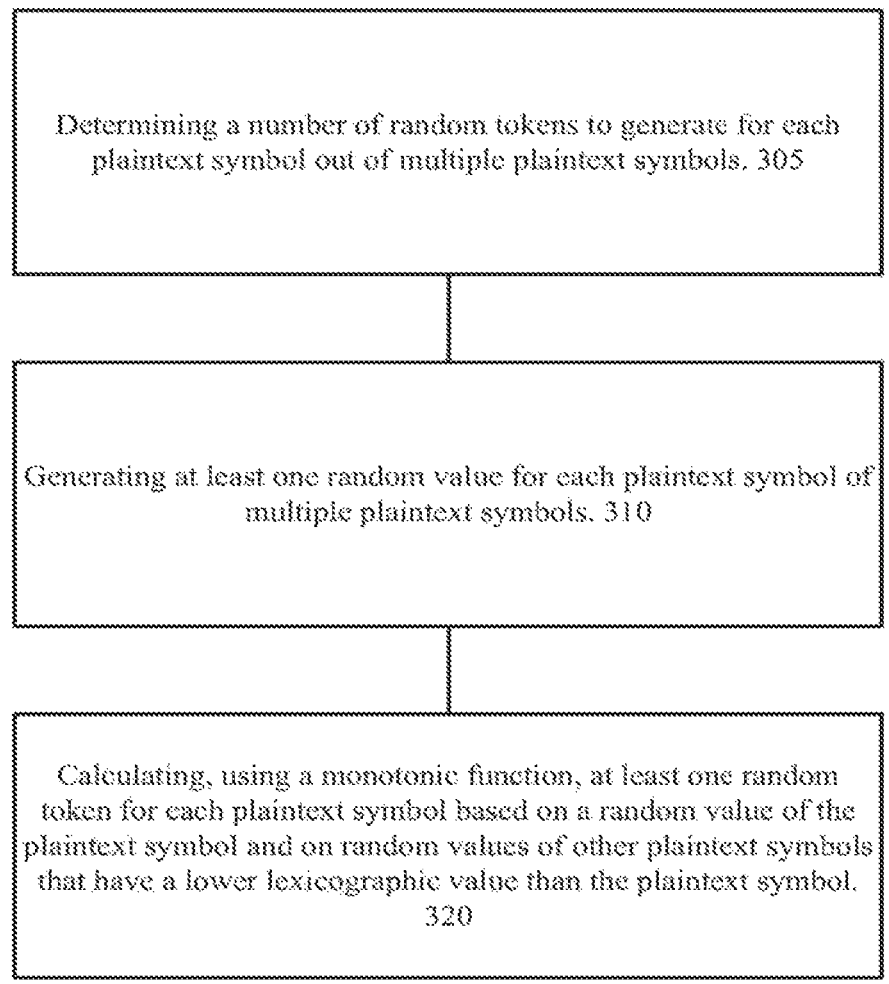

FIG. 3 illustrates a method 300 for generating an encryption dictionary, according to an embodiment of the invention.

Method 300 of FIG. 3 differs from method 200 of FIG. 2 by calculating, for at least one plaintext symbol, multiple random tokens. Thus—one or more other plaintext symbols can have multiple random tokens each. Multiple random tokens can be calculated for plaintext symbols that are more popular than other plaintext symbols, or are more popular that a popularity threshold, although the selection can be done according to any other criterion.

The popularity can be monitored, can be evaluated over time, and can represent statistics about the usage of plaintext symbols. The popularity can be evaluated per language, per application, per user, and the like.

Method 300 may start by stage 305 of determining a number of random tokens to generate for each plaintext symbol out of multiple plaintext symbols. For one or more plaintext symbols this number exceeds one. Thus, stage 305 can include selecting plaintext symbols that their popularity exceeds a threshold. For example, it may be assumed that John is very popular and that two random tokens should be generated for John—RT(4) and RT(5).

Stage 305 may be followed by stage 310 of generating a random value for each plaintext symbol of multiple plaintext symbols. Stage 310 may include applying a random or a pseudo-random process. Random values RV(1)-RV(m) are calculated for plaintext symbols PS(1)-PS(n). If a single random value is calculated per each plaintext symbol then n equals m. If, one or more plaintext symbol is associated with multiple random tokens then m>n. Referring to the example above n=4 and m=5 as John is allocated with two random tokens.

Stage 310 may be followed by stage 320 of calculating, using a monotonic function, at least one random token for each plaintext symbol based on a random value of the plaintext symbol and on random values of other plaintext symbols that have a lower lexicographic value than the plaintext symbol. Stage 320 may include applying a monotonic increasing function.

If, for example a group of multiple random values are generated per a certain plaintext symbol then different random values of the group are responsive to the random values of plaintext symbols that precede that certain plaintext symbol. The values of random values of the group can also be affected by each other.

The calculating can include summing, applying a weighted sum and the like.

Stage 320 may include calculating multiple random tokens for a single plaintext symbol so that values of the random tokens of other plaintext symbols are outside a range that is span by values of the multiple random tokens of the single plaintext symbol.

Figure 4:
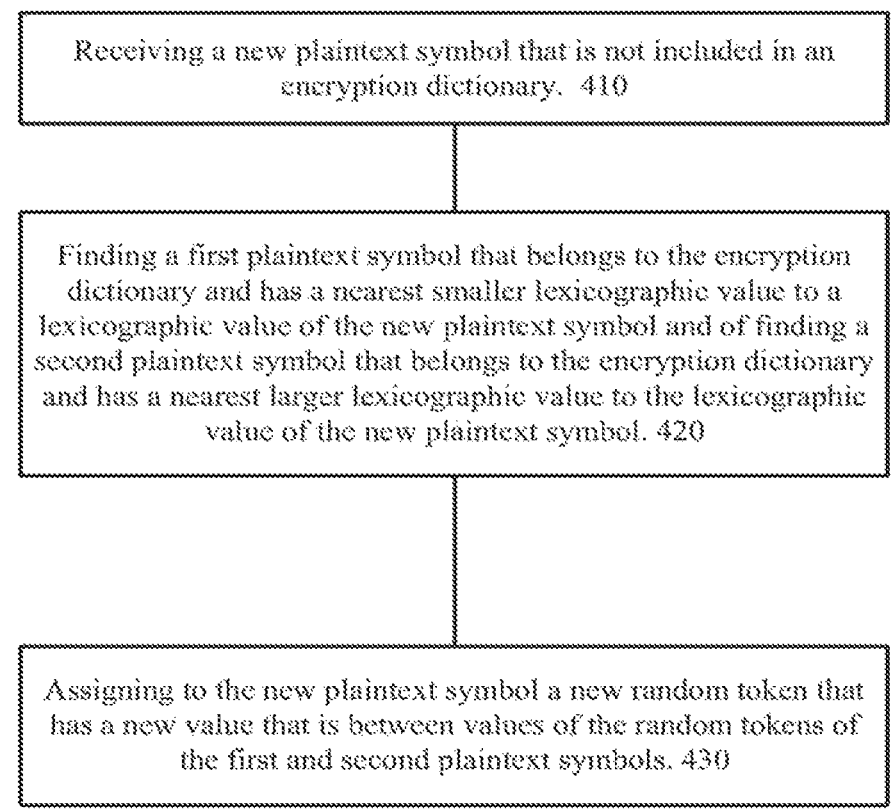

FIG. 4 illustrates a method 400 for updating an encryption dictionary according to an embodiment of the invention.

Method 400 can start by stage 410 of receiving a new plaintext symbol that is not included in an encryption dictionary. The encryption dictionary may be generated by anyone of methods 200, 300, or a combination of one or more of these methods.

The new plaintext symbol can be received at any time after the encryption dictionary is generated. It is noted that the encryption dictionary can also be updated by removing unused plaintext symbols but this is not necessarily so.

Stage 410 may be followed by stage 420 finding a first plaintext symbol that belongs to the encryption dictionary and has a nearest smaller lexicographic value to a lexicographic value of the new plaintext symbol and of finding a second plaintext symbol that belongs to the encryption dictionary and has a nearest larger lexicographic value to the lexicographic value of the new plaintext symbol.

Stage 420 may be followed by stage 430 of assigning to the new plaintext symbol a new random token that has a new value that is between values of the random tokens of the first and second plaintext symbols.

Stage 430 may include randomly selecting the new value of the random token within a range of numbers that is limited by values of the random tokens of the first and second plaintext symbols.

Stage 430 may include assigning the new random token by adding a suffix to the random token of first plaintext symbol. The addition of a suffix (least significant bits) does not change the location of the new random token—as lexicographic sort operation operate from the most significant bit towards the least significant bits (from left to right).

According to an embodiment of the invention at least one plaintext symbol may be represented by a group of random tokens. If, for example, it is desired that a new random token will not be located within a space that is span by the group of random tokens, then the selection of the first and second plaintext symbols should be responsive to the values of random tokens of the group. For example—if the new random token should have a value that is greater than all the random tokens of the group then the biggest random token of the group should be taken into account when calculating the value of the new random token. Yet for another example—if the new random token should have a value that is lower than all the random tokens of the group then the lowest random token of the group should be taken into account when calculating the value of the new random token.

Accordingly, if the first plaintext symbol is represented by the group of random tokens than the new random token should have a value that is higher than the value of the highest random token of the group. If the second plaintext symbol is represented by the group of random tokens than the new random token should have a value that is lower than the value of the lowest random token of the group. Thus, as the limits for choosing a new token we are taking in this case by the highest random value that represent the plaintext symbol that has the nearest smaller lexicographic value to lexicographic value of the new plaintext value and the lowest random value that represent the nearest larger lexicographic value to the lexicographic value of the new plaintext symbol.

Information about the allocation of more than a single random token per plaintext symbol (or information about the number of random tokens per plaintext symbols) can be included in the encryption table or in another data structure.

Figure 5:
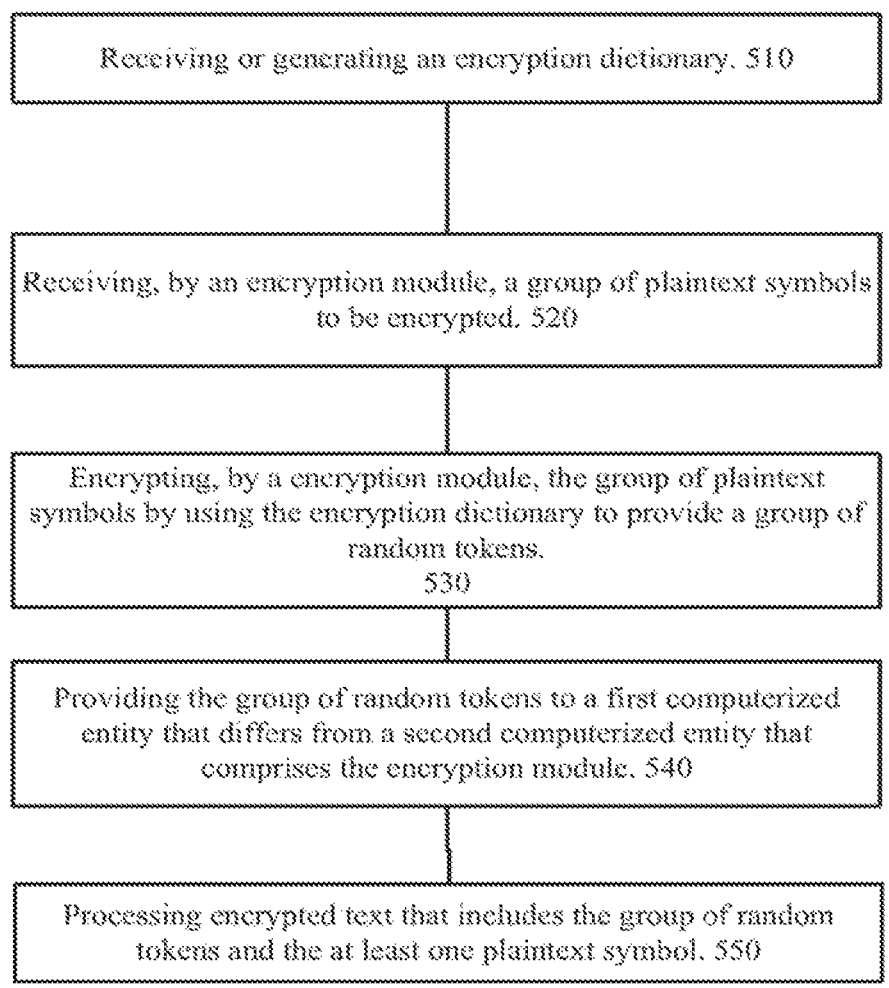

FIG. 5 illustrates method 500 for symbol based encryption according to an embodiment of the invention.

Method 500 starts by stage 510 of receiving or generating an encryption dictionary. The encryption dictionary can be generated by any method of methods 200-300 and can be updated by method 400. The encryption dictionary is generated or received by a second computerized entity.

It is noted that an encryption dictionary can be generated per user, per application, per organization and the like. For simplicity of explanation the following example refers to a single encryption dictionary.

Stage 510 may be followed by stage 520 of receiving, by an encryption module, a group of plaintext symbols to be encrypted. Stage 520 may be preceded by a stage (not shown) of selecting which plaintext symbol to encrypt, said selection can be executed by a sensitivity module.

Stage 520 may be followed by stage 530 of encrypting, by the encryption module, the group of plaintext symbols by using the encryption dictionary to provide a group of random tokens. Stage 530 can include selecting which encryption dictionary to use, whether to perform an order preserving encryption or not.

Stage 530 may be followed by stage 540 of providing the group of random tokens to a first computerized entity that differs from the second computerized entity. Stage 540 may also include providing to the first computerized entity at least one plaintext symbols that was not encrypted. It is noted that a text can be received by the first computerized entity while most of the text is not encrypted—for example a file can be provided wherein only 5 percent of the file is encrypted. It is noted that most of the file and even the entire file can be encrypted.

Stage 540 may be followed by stage 550 of processing encrypted text that includes the group of random tokens and the at least one plaintext symbol. The processing can be executed by the first computerized entity and may include sorting, searching and the like. The sorting or searching can be case sensitive or case insensitive.

It is noted that decryption methods can be provided. Each decryption method reverses the operation of an encryption method. Thus, case sensitive encryption may be followed by case sensitive decryption, but this is not necessarily so.

Stage 530 may include detecting predefined patterns that should be encrypted according to predefined encryption schemes. For example, stage 530 may include detecting an email address that comprises two plaintext strings that are separated by an at sign (@) and generating an encrypted email address that comprises two random tokens that are separated by an at sign—"RT(q)@RT(j)".

Stage 530 may include detecting an email address that includes two plaintext strings that are separated by an at sign and converting it to an encrypted email address that includes two random tokens that may be separated by a symbol and are followed by an at sign, wherein the at sign is followed by a predefined domain name that identifies a computerized entity that IS arranged to assist m decrypting the encrypted email address (RT(q).RT(j))@predefined_domain_name).

Figure 6:
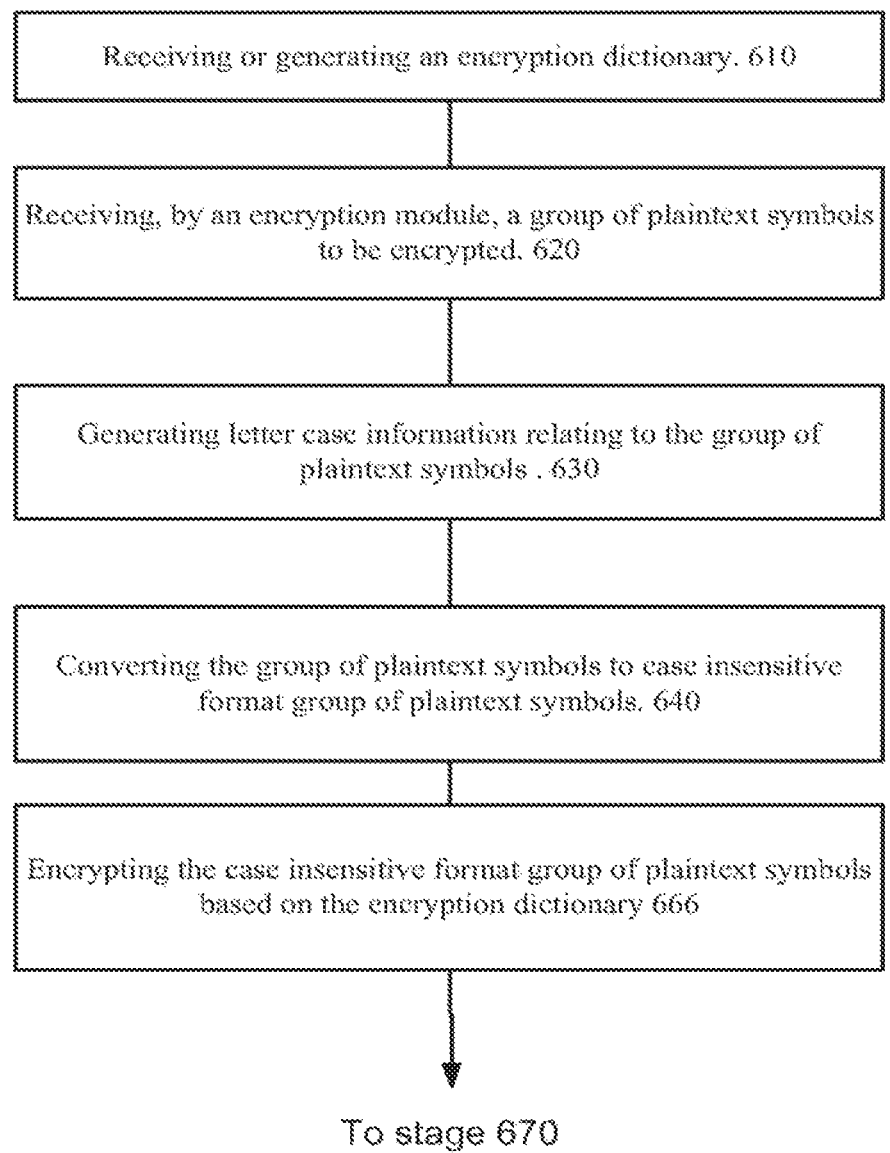
Figure 7:
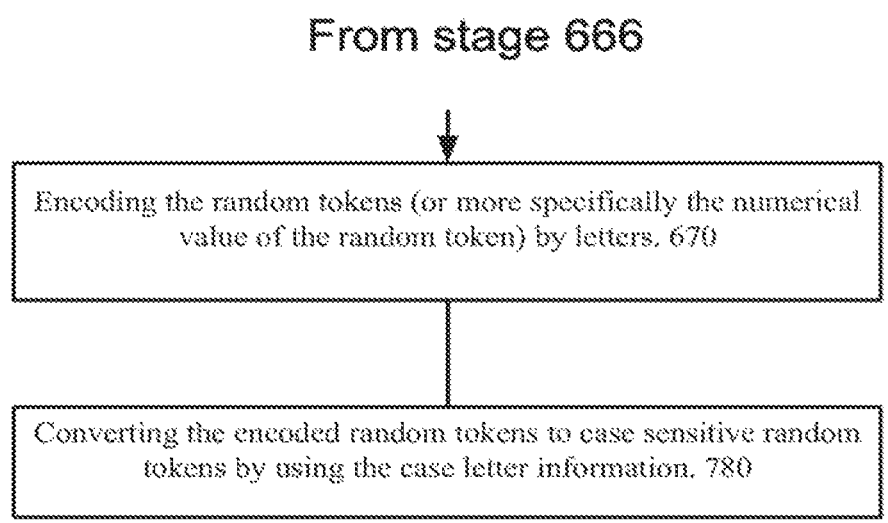

FIGS. 6 and 7 illustrate a method 600 for symbol based encryption, according to an embodiment of the invention.

Method 600 starts by stage 610 of receiving or generating an encryption dictionary. The encryption dictionary can be generated by any method of methods 200-300 and can be updated by method 400. The encryption dictionary is generated or received by a second computerized entity.

Stage 610 may be followed by stage 620 of receiving, by an encryption module, a group of plaintext symbols to be encrypted. Stage 620 may be preceded by a stage (not shown) of selecting which plaintext symbol to encrypt, said selection can be executed by a sensitivity module.

Stage 620 may be followed by stage 630 of generating letter case information relating to multiple plaintext symbols. For example—for each one of Bob, Helen, John and Rob the case letter information will indicate that only the first letter is an upper case letter. Thus four vectors can be generated: (1,0,0), (1,0,0,0,0), (1,0,0,0) and (1,0,0).

Stage 630 may be followed by stage 640 of converting the multiple plaintext symbols to a format that is case insensitive. Stage 640 can include converting all upper case letters to lower case letters or converting all lower case letters to upper case letters. It is assumed, for convenience of explanation that all letters are converted to lower case letters so that stage 640 provides lower case plaintext symbols. For example—Bob, Helen, John and Rob can be converted to bob, helen, john and rob.

Stage 640 may be followed by stage 666 of encrypting, by the encryption module, the group of plaintext symbols by using the encryption dictionary to provide a group of random tokens. Stage 666 can include selecting which encryption dictionary to use, whether to perform an order preserving encryption or not.

Stage 666 may be followed by stage 670 of encoding the random tokens (or more specifically the numerical value of the random token) by letters. The encoding can be case insensitive—so that the random tokens are represented by letters of the same case.

Although not shown in FIG. 6, stage 670 (or 660) may be followed by stage 540 and, additionally or alternatively, stage 550 of method 500.

Stage 670 is followed by stage 780 of converting the encoded random tokens to case sensitive random tokens by using the case letter information.

Stage 780 can be followed by stage 540 and, additionally or alternatively, stage 550 of method 500.

Figure 8:
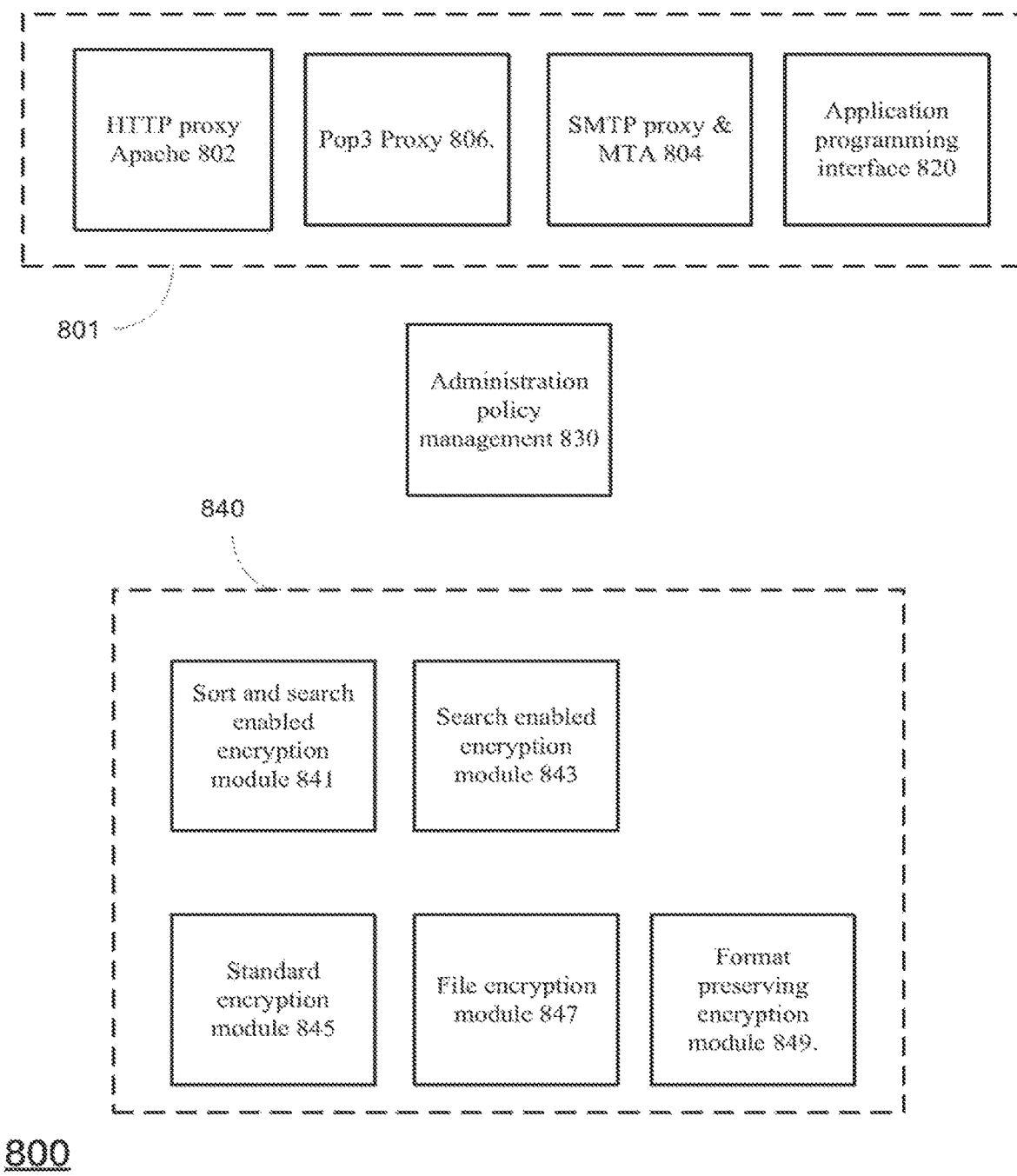
FIG. 8 illustrates a security module internal structure according to an embodiment of the invention.

It is noted that either one of the symbol based encryption methods 500, 600 and 700 can be executed in addition to other encryption methods. Accordingly, each method can be preceded (or may include) a stage of selecting which encryption scheme to select. FIG. 8 illustrates a security module 800 that can elect between different types of encryption such as symbol based encryption (such as sort and search enabled encryption and search enabled encryption) as well as standard encryption using NIST standard algorithms, file encryption using AES in CBC mode and format preserving encryption, and other encryption engines.

FIG. 8 illustrates a security module 800 according to an embodiment of the invention.

Security module 800 includes:
  a. A communication module 801 that includes a HTTP proxy Apache 802, SMTP proxy & MTA 804, a Pop3

Proxy 806. It is noted that other proxies can provided instead or in addition to these proxies;

b. An application programming interface 820;

c. An administration policy management 830 that determines which encryption process to elect and which data elements to encrypt (thus it may have a sensitivity module functionality); and d. Encryption modules (collectively denoted 840) such as sort and search enabled encryption module 841, search enabled encryption module 843, standard encryption module using NIST standard algorithms 845, file encryption module using AES in CBC mode 847 and format preserving encryption module 849.

Security module 800 may have the functionality of security module 10. It may perform either one of the encryptions method illustrated above. The administration policy management 830 may determine when to apply each encryption method.

Figure 9:
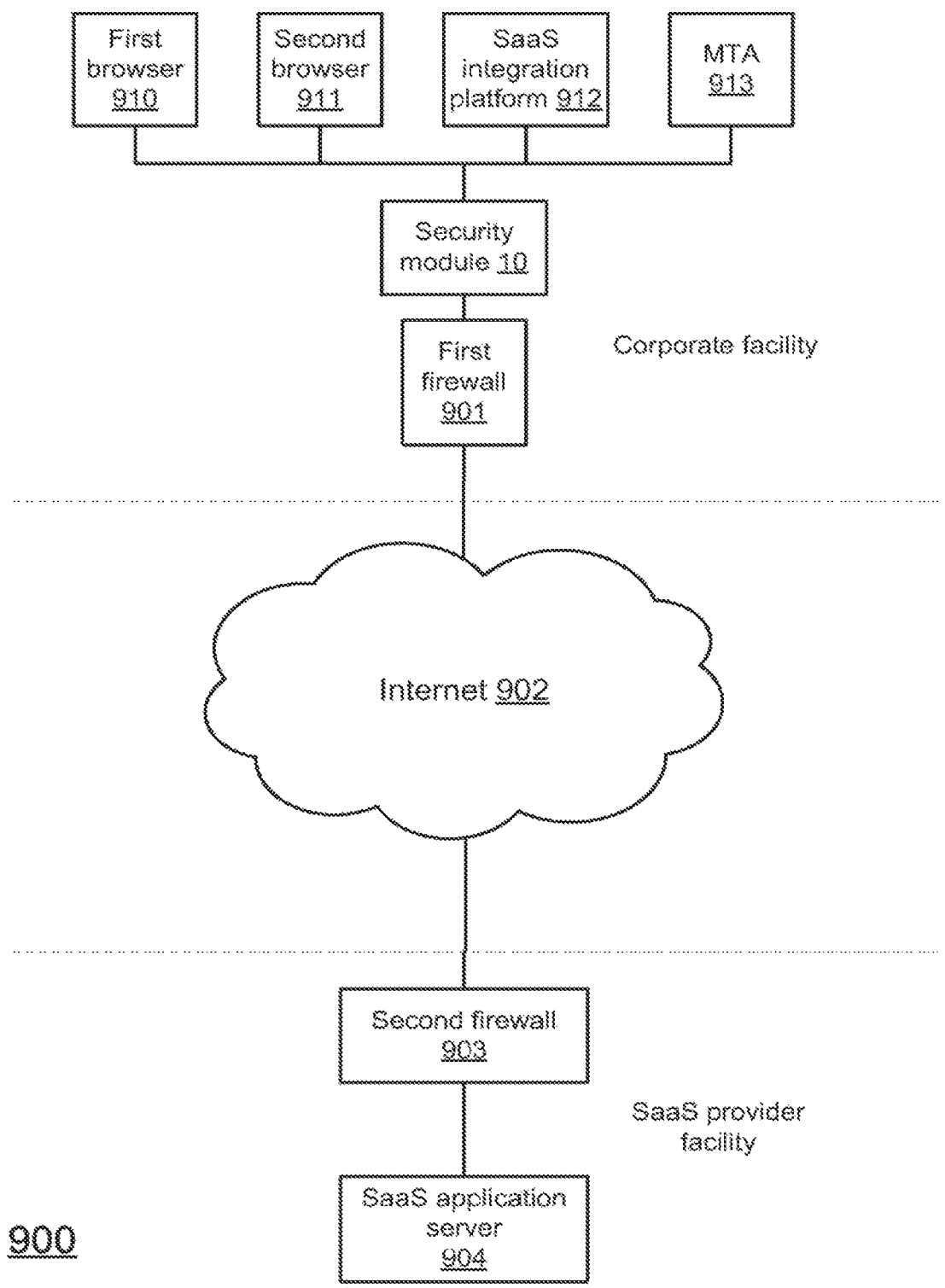
FIGS. 9-11 illustrate security modules and their deployment options according to various embodiments of the invention.
Figure 10:
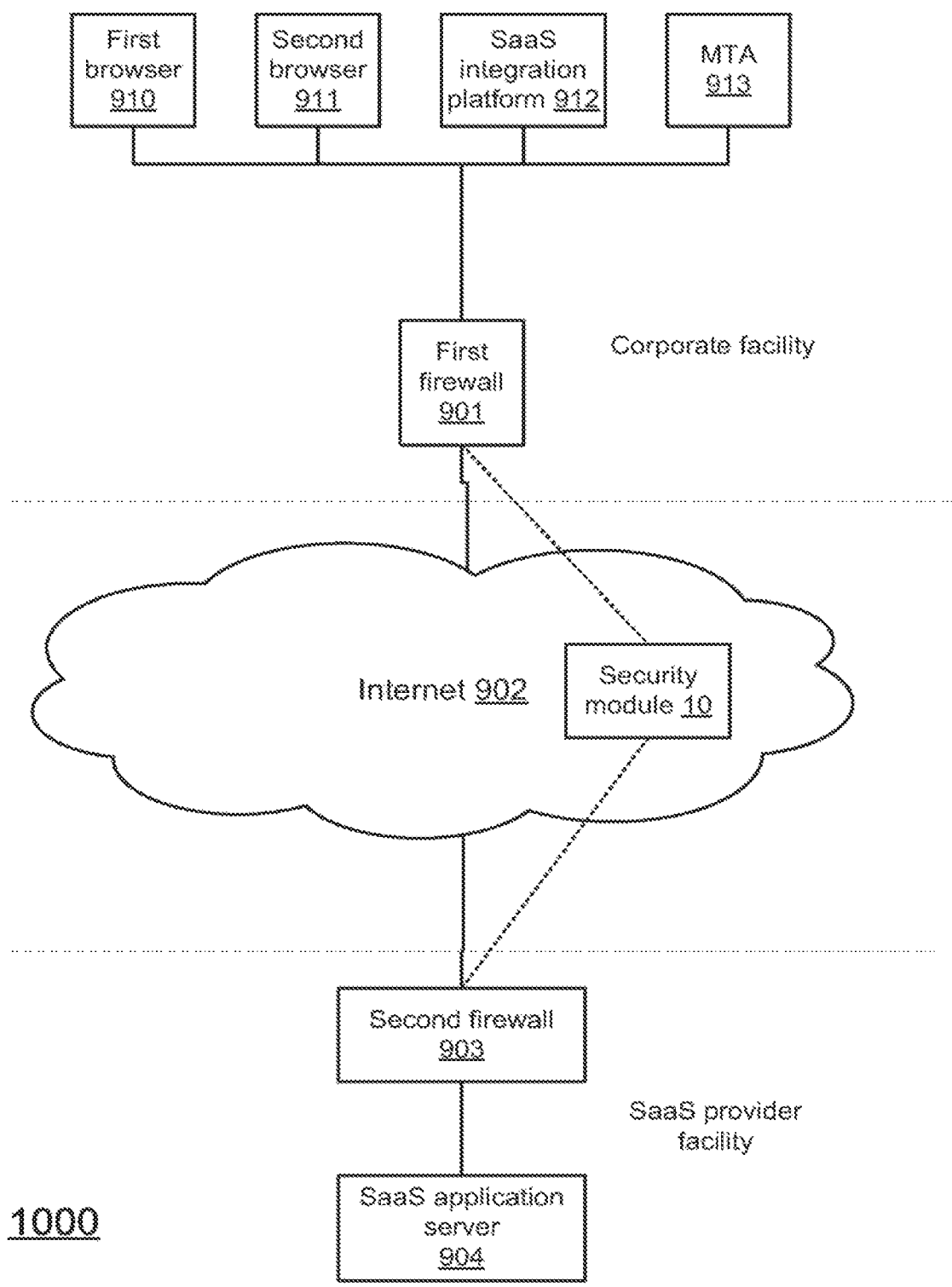
Figure 11:
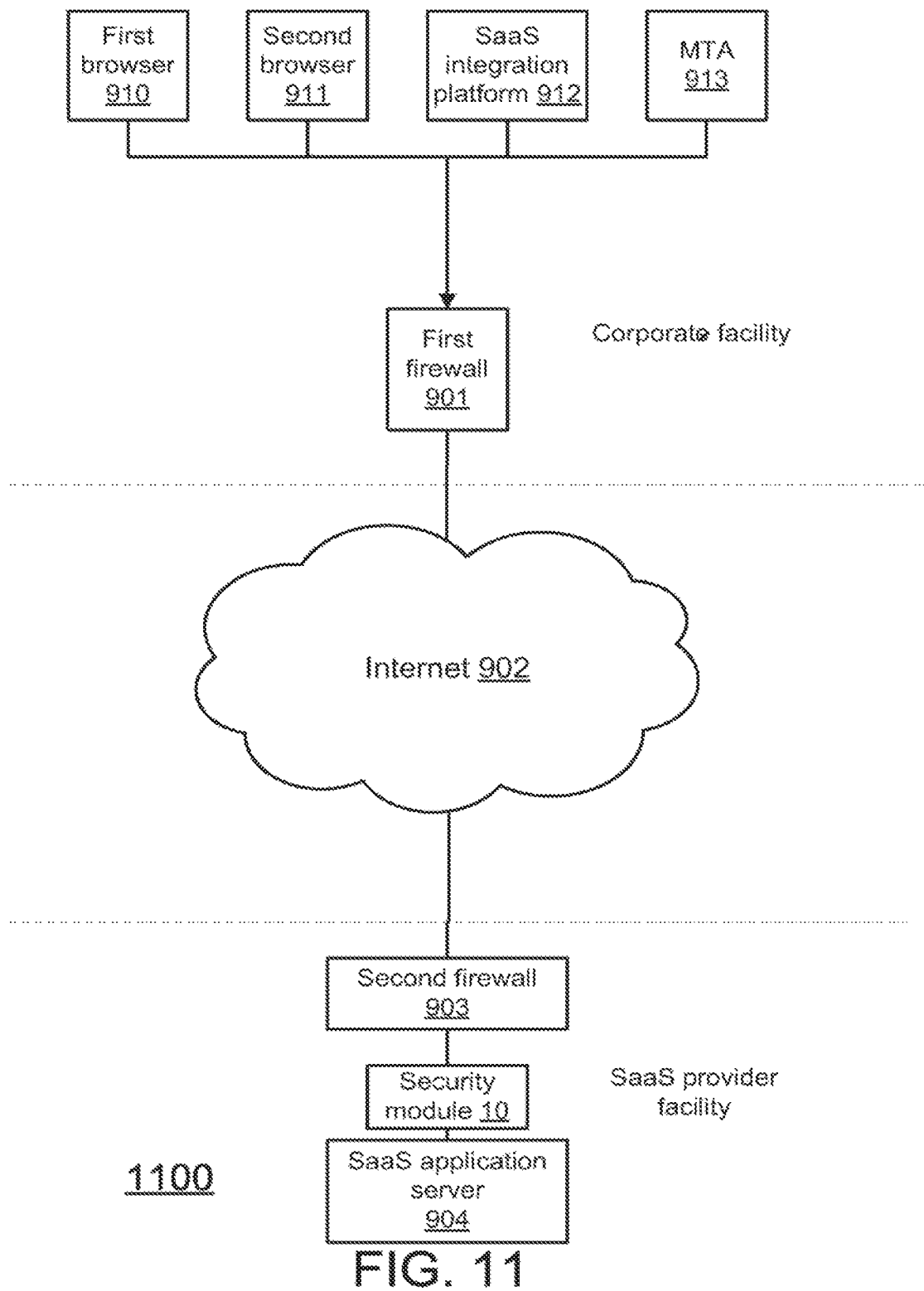

FIGS. 9-11 illustrate security modules 10 and their environments according to various embodiments of the invention.

FIGS. 9-11 illustrates three optional locations of security module 10.

A corporate facility may host multiple applications such as web browsers 910 and 911, SaaS integration platform 912, mail transfer agent 913, all of which should access the Internet 901 via a first firewall 901.

A SaaS application facility may include a SaaS application server 904 that is coupled to the Internet 902 via a second firewall 903.

FIG. 9 illustrates security module 10 and its environment 900. The security module 10 is connected before the first firewall 901. It should be noted that is this deployment option the enterprise has the greatest control on the data.

FIG. 10 illustrates security module 10 and its environment 1000. FIG. 10 illustrates the security module 10 as being coupled between the first and second firewalls 901 and 903 as a service in the cloud.

FIG. 11 illustrates security module 10 and its environment 1100. FIG. 11 illustrates the security module 10 as being connected between the second firewall 903 and the SaaS application server 904.

Figure 12:
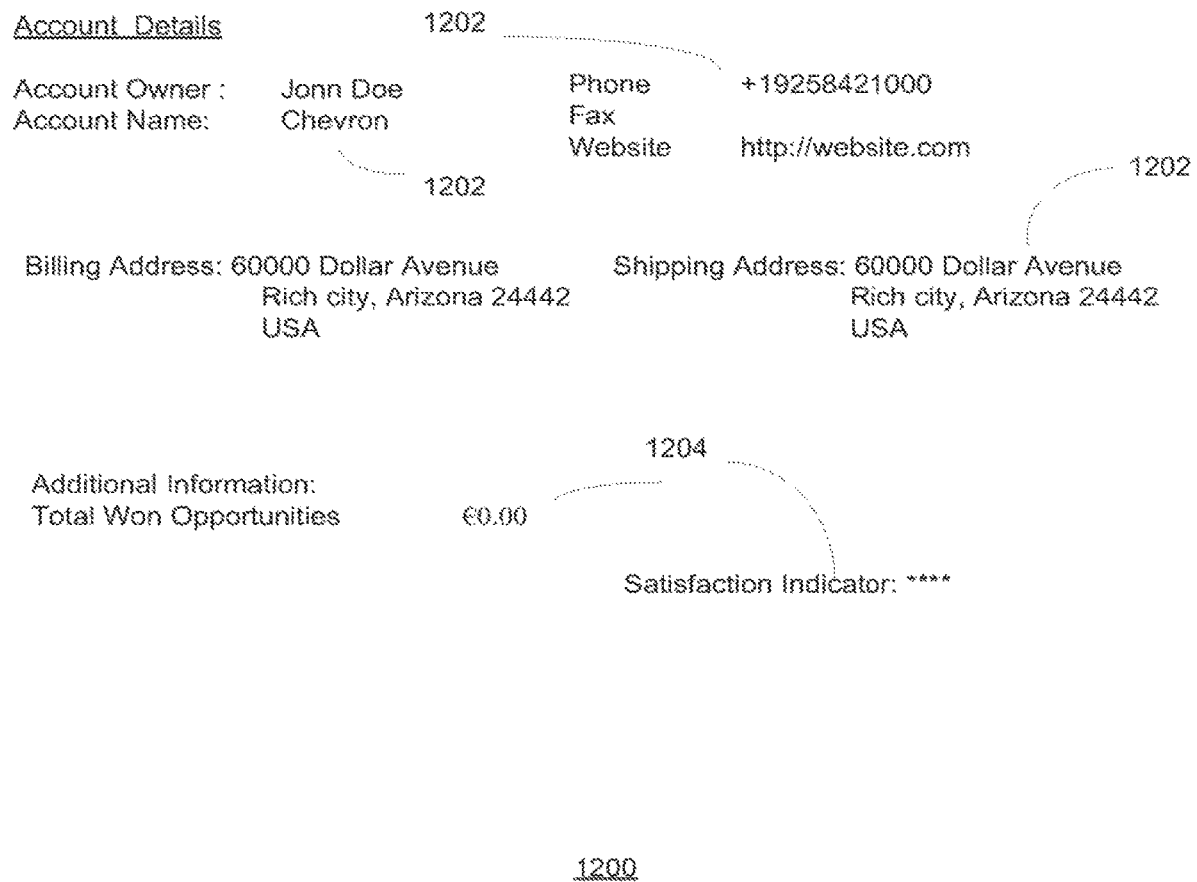
FIGS. 12-13 illustrate a graphic user interface (GUI) of a SaaS application presenting a screen with a plain text data and the corresponding encrypted data according to an embodiment of the invention.
Figure 13:
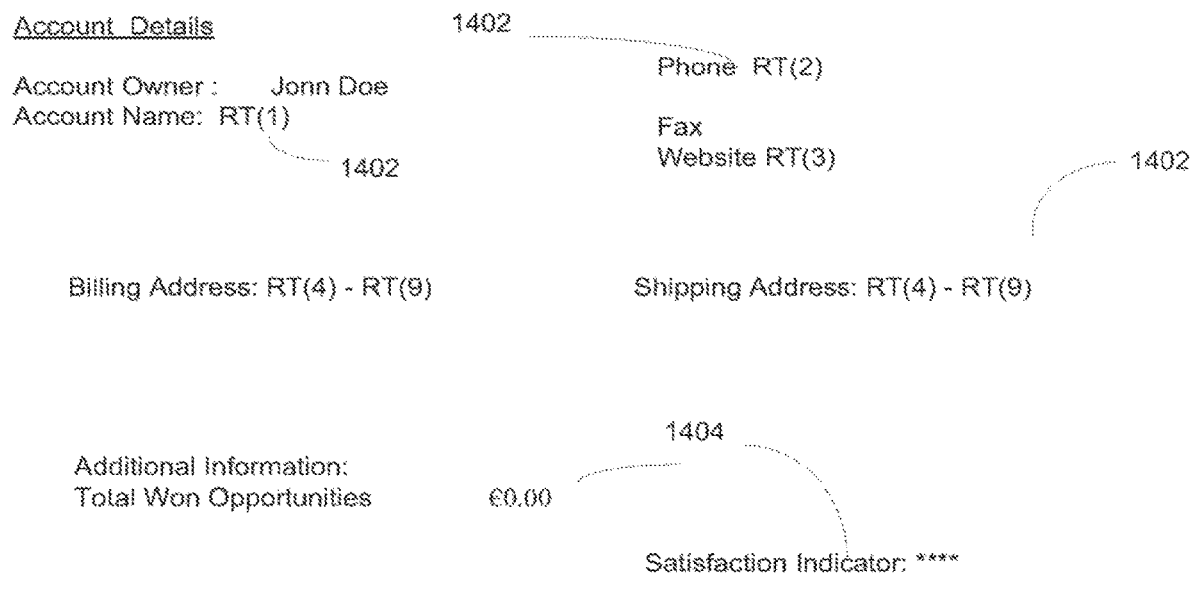

FIGS. 12 and 13 illustrate graphic user interfaces 1200 and 1300 according to an embodiment of the invention.

The GUI 1200 displays multiple fields 1202 and 1204 of a form that may be displayed (or filled in) by a SaaS application. The content of some of the fields (1202) should be encrypted—and these fields can be marked by using the GUI 1200. These fields 1202 can include, for example, an address billing field, a shipping address field, an account name field, a phone number, fax number and website fields. Other fields (1204) should not be encrypted—they may include a total won opportunities field, a satisfaction indicator field and the like. The GUI can also allow to define which type of encryption should be applied, and additionally or alternatively—which type of encoding (if applied) should be applied. The random tokens are denoted RT(1)-RT(9). A non-limiting example of a random token can be NSPREF1abhaglemkncaiiehNSSUF1.

GUI 1300 displays the same fields, but fields 1402 are random tokens that replace fields 1202. Thus, address billing field, a shipping address field, an account name field, a phone number, fax number and website fields are filled with random tokens. Other fields (1404) such as a total won opportunities field and a satisfaction indicator field include plaintext symbols.

Either one of the mentioned above methods can be executed by a processor that may executed instructions (code) stored in non-transitory computer readable medium.

A non-transitory computer readable medium can be provided that stores instructions for: generating a random value for each plaintext symbol of multiple plaintext symbols; and calculating, using a monotonic function, a random token for each plaintext symbol based on a random value of the plaintext symbol and on random values of other plaintext symbols that have a lower lexicographic value than the plaintext symbol; wherein the encryption dictionary comprises a mapping between the multiple plaintext symbols and random values of the multiple plaintext symbols.

The non-transitory computer readable medium can store instructions for calculating the random token of plaintext symbol by summing the random values of other plaintext symbols that have a lower lexicographic value than the plaintext symbol.

The non-transitory computer readable medium can store instructions for calculating the random token of the plaintext symbol by applying a weighted sum of the random values of other plaintext symbols that have a lower lexicographic value than the plaintext symbol.

The non-transitory computer readable medium can store instructions for calculating multiple random tokens for a single plaintext symbol.

The non-transitory computer readable medium can store instructions for calculating multiple random tokens for a single plaintext symbol that has a popularity level that exceeds a predefined popularity level.

The non-transitory computer readable medium can store instructions for calculating multiple random tokens for the single plaintext symbol so that values of random tokens of other plaintext symbols are outside a range that is span by values of the multiple random tokens of the single plaintext symbol.

The non-transitory computer readable medium can store instructions for: receiving a new plaintext symbol that is not included in the encryption dictionary; finding a first plaintext symbol that belongs to the encryption dictionary and has a nearest smaller lexicographic value to a lexicographic value of the new plaintext symbol; finding a second plaintext symbol that belongs to the encryption dictionary and has a nearest larger lexicographic value to the lexicographic value of the new plaintext symbol; and assigning to the new plaintext symbol a new random token that has a new value that is between values of the random tokens of the first and second plaintext symbols.

The non-transitory computer readable medium can store instructions for randomly selecting the new value of the random token within a range of numbers that is limited by values of the random tokens of the first and second plaintext symbols.

The non-transitory computer readable medium can store instructions for assigning the new random token by adding a suffix to the random token of first plaintext symbol.

The non-transitory computer readable medium can store instructions for selecting the multiple plaintext symbols.

The non-transitory computer readable medium can store instructions for encoding a numerical value of each random token to an alphabetic value.

The non-transitory computer readable medium can store instructions for encoding the numerical value of each random token to a sequence of small case letters.

The non-transitory computer readable medium can store instructions for encoding the numerical value of each random token to a sequence of Armenian letters.

The non-transitory computer readable medium can store instructions for: receiving a group of plaintext symbols to be encrypted; encrypting by a second computerized entity plaintext symbols of the group of plaintext symbols by using the encryption dictionary to provide a group of random tokens; and providing the group of random tokens to a first computerized entity that differs from the second computerized entity.

The non-transitory computer readable medium can store instructions for: receiving text; selecting out of the text the group of plaintext symbols to be encrypted; and selecting at least one plaintext symbols to be provided to the first computerized entity without being encrypted.

The non-transitory computer readable medium can store instructions for performing sorting and search operations by the first computerized entity on the group of random tokens.

The non-transitory computer readable medium can store instructions for detecting an email address that comprises two plaintext strings that are separated by an at sign; and generating an encrypted email address that comprises two random tokens that are separated by an at sign.

The non-transitory computer readable medium can store instructions for detecting an email address that comprises two plaintext strings that are separated by an at sign; and generating an encrypted email address that comprises two random tokens that are followed by an at sign, wherein the at sign is followed by a predefined domain name that identifies a computerized entity that is arranged to assist in decrypting the encrypted email address.

The non-transitory computer readable medium can store instructions for decrypting the encrypted email address and sending an email message that comprises the email address to a destination defined by the email address.

The non-transitory computer readable medium can store instructions for generating letter case information relating to the group of plaintext symbols to be encrypted.

The non-transitory computer readable medium can store instructions for comprising converting each upper case letter of the group of plaintext symbols to be encrypted to a lower case letter to provide lower case plaintext symbols; and calculating the random value for each lower case plaintext symbol.

The non-transitory computer readable medium can store instructions for converting each lower case letter of the group of plaintext symbols to be encrypted to an upper case letter to provide upper case plaintext symbols; and calculating the random value for each upper case plaintext symbol.

The non-transitory computer readable medium can store instructions for generating random tokens in response to the letter case information.

The non-transitory computer readable medium can store instructions for generating at least one additional dictionary for at least one other set of plaintext symbols.

The non-transitory computer readable medium can store instructions for generating at least one additional dictionary for at least one other set of plaintext symbols; wherein different dictionaries are allocated for different applications or for different users.

A non-transitory computer readable medium can be provided that can store instructions for: receiving, by a first computerized entity and over a communication network, text that comprises multiple random tokens and a plurality of plaintext symbols; wherein the multiple random tokens are generated by a second computerized entity; wherein a value of each random token that represents a plaintext symbol is responsive to values of random tokens that represents plaintext symbols that have a lower lexicographic value than the plaintext symbol; and processing the text by the first computerized entity.

The processing is selected from a group consisting of sorting and searching.

The first computerized entity supports a software as a service application.

The first computerized entity supports a data base application.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for searching encrypted data, the method comprising:
   maintaining a data store having data encrypted on a per symbol basis using a selected encryption protocol, wherein data elements have been replaced with random tokens and a lexicographic order between the random tokens and the plaintext data elements they represent has been maintained and each encrypted element has a unique prefix and suffix;
   receiving a textual search request;
   applying to search terms of the textual search request the selected encryption protocol;
   performing a search utilizing encrypted search terms encrypted using the selected encryption protocol; and
   generating a response to the search.

2. The method according to claim 1, wherein generating the response to the search comprises utilizing the prefixes and the suffixes to replace encrypted elements in the response with corresponding plaintext values.

3. The method according to claim 2, wherein the response comprises a portion of a page accessed via a browser application of a remote electronic device from which the textual search request was received.

4. The method according to claim 2, wherein the response comprises a file sent to a remote electronic device from which the textual search request was received.

5. The method according to claim 1, wherein the searching, the applying, the performing and the generating are performed by a proxy server between a client-side application and an application server.

6. The method according to claim 1, wherein the searching, the applying, the performing and the generating are performed by a reverse proxy server between a client-side application and an application server.

7. A non-transitory computer-readable medium having stored thereon instructions that, when executed by one or more processors, are configurable to cause the one or more processors to:
   maintain a data store having data encrypted on a per symbol basis using a selected encryption protocol, wherein data elements have been replaced with random tokens and a lexicographic order between the random tokens and the plaintext data elements they represent has been maintained and each encrypted element has a unique prefix and suffix;
   receive a textual search request;
   apply to search terms of the textual search request the selected encryption protocol;
   perform a search utilizing encrypted search terms encrypted using the selected encryption protocol; and
   generate a response to the search.

8. The non-transitory computer-readable medium according to claim 7, wherein generating the response to the search comprises utilizing the prefixes and the suffixes to replace encrypted elements in the response with corresponding plaintext values.

9. The non-transitory computer-readable medium according to claim 8, wherein the response comprises a portion of a page accessed via a browser application of a remote electronic device from which the textual search request was received.

10. The non-transitory computer-readable medium according to claim 8, wherein the response comprises a file sent to a remote electronic device from which the textual search request was received.

11. The non-transitory computer-readable medium according to claim 7, wherein the searching, the applying, the performing and the generating are performed by a proxy server between a client-side application and an application server.

12. The non-transitory computer-readable medium according to claim 7, wherein the searching, the applying, the performing and the generating are performed by a reverse proxy server between a client-side application and an application server.

13. A system comprising:
at least one memory device;
one or more hardware processors coupled with the at least one memory device, the one or more hardware processors to maintain a data store having data encrypted on a per symbol basis using a selected encryption protocol, wherein data elements have been replaced with random tokens and a lexicographic order between the random tokens and the plaintext data elements they represent has been maintained and each encrypted element has a unique prefix and suffix, to receive a textual search request, to apply to search terms of the textual search request the selected encryption protocol, to perform a search utilizing encrypted search terms encrypted using the selected encryption protocol, and to generate a response to the search.

14. The system according to claim 13, wherein generating the response to the search comprises utilizing the prefixes and the suffixes to replace encrypted elements in the response with corresponding plaintext values.

15. The system according to claim 14, wherein the response comprises a portion of a page accessed via a browser application of a remote electronic device from which the textual search request was received.

16. The system according to claim 14, wherein the response comprises a file sent to a remote electronic device from which the textual search request was received.

17. The system according to claim 13, wherein the searching, the applying, the performing and the generating are performed by a proxy server between a client-side application and an application server.

18. The system according to claim 13, wherein the searching, the applying, the performing and the generating are performed by a reverse proxy server between a client-side application and an application server.

* * * * *